United States Patent
Tang

(10) Patent No.: US 10,880,916 B2
(45) Date of Patent: Dec. 29, 2020

(54) RESOURCE SCHEDULING METHOD AND APPARATUS FOR LOGICAL CHANNEL

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/353,719

(22) Filed: Mar. 14, 2019

(65) Prior Publication Data

US 2019/0215850 A1 Jul. 11, 2019

Related U.S. Application Data

(63) Continuation of application No. PCT/CN2017/088461, filed on Jun. 15, 2017.

(51) Int. Cl.
*H04W 72/12* (2009.01)
*H04W 76/15* (2018.01)
*H04W 72/14* (2009.01)

(52) U.S. Cl.
CPC ....... *H04W 72/1268* (2013.01); *H04W 72/14* (2013.01); *H04W 76/15* (2018.02)

(58) Field of Classification Search
CPC .. H04W 72/1268; H04W 76/15; H04W 72/14
See application file for complete search history.

(56) References Cited

U.S. PATENT DOCUMENTS

| 10,237,784 | B2 * | 3/2019 | Loehr | H04L 61/6022 |
| 10,306,699 | B2 * | 5/2019 | Uchino | H04W 76/15 |
| 10,462,709 | B2 * | 10/2019 | Hong | H04W 36/00837 |
| 2017/0142770 | A1 * | 5/2017 | Fu | H04L 1/1614 |
| 2019/0150176 | A1 * | 5/2019 | Pelletier | H04W 72/1247 370/329 |

FOREIGN PATENT DOCUMENTS

| CN | 105451336 A | 3/2016 |
| WO | 2016/021981 A1 | 2/2016 |

(Continued)

OTHER PUBLICATIONS

Ericsson,R2-1702752, On MAC for NR CA, Ericsson, TSG-RAN WG2 #97bis, Spokane, USA, Apr. 3-7, 2017 (Year: 2017).*

(Continued)

*Primary Examiner* — Mounir Moutaouakil
(74) *Attorney, Agent, or Firm* — Ladas & Parry LLP

(57) ABSTRACT

The present disclosure provides a resource scheduling method and apparatus for a logical channel. The method includes: after an uplink grant resource are obtained, selecting a logical channel from two logical channels mapped to a same PDCP (packet data convergence protocol) entity to participate in uplink grant resource scheduling for a present transmission, where the two logical channels carry an original PDCP PDU (protocol data unit) and a duplicate PDCP PDU, respectively. The present disclosure is applicable to logical channel resource scheduling for data duplication in a 5G NR system.

16 Claims, 4 Drawing Sheets

(56) References Cited

FOREIGN PATENT DOCUMENTS

WO 2016/163660 A1 10/2016
WO 2018184503 A1 10/2018

OTHER PUBLICATIONS

Supplementary European Search Report (SESR) dated Jul. 18, 2019 for Application No. EP 17913769.0.
Ericsson: "Controlling of duplication in case of CA", 3GPP Draft; R2-1702753—Controlling of duplication in case of CA, 3rd Generation Partnership Project (GPP). Mobile Competence Centre; 650, Route des Lucioles; F-06921 Sophia-Antipolis Cedex; Fran, vol. RAN WG2t No. Spokane, USA; Apr. 3, 2017-Apr. 7, 2017, Mar. 25, 2017 (Mar. 25, 2017), XP051254259.
Oppo: "MAC operation on the duplicated data from PDCP layer", 3GPP Draft; R2-1702548 MAC Operations on the Duplicated-Data From PDCP Layer, 3rd Generation Partnership Project (3GPP), Mobile Competence Centre, 650, Route Des Lucioles; F-06921 Sophia-Antipolis C, vol. RAN WG2, No. Spokane, USA; Apr. 3, 2017-Apr. 7, 2017, Mar. 24, 2017 (Mar. 24, 2017), XP051253208.
3gpp: "3rd Generation Partnership Project: Technical Specification Group Radio Access Network; Evolved Universal Terrestrial Radio Access (E-UTRA); Medium Access Control (MAC) protocol specification (Release 14)", 3GPP TS 36.321 V14.2.1, Apr. 27, 2017 (Apr. 27, 2017), pp. 1-106, XP55566698.
"3 Generation Partnership Project; Technical Specification Group Radio Access Network; Evolved Universal Terrestrial Radio Access (E-UTRA); Packet Data Convergence Protocol (PDCP) specification (Release 14)", 3GPP Standard; Technical Specification; 3GPP TS 36.323, 3rd Generation Partnership Project (3GPP), Mobile Competence Centre; 650, Route Des Lucioles; F-06921 Sophia-Antipolis Cedes; France, vol. RAN WG2, No. V14.2.0, Mar. 22, 2017 (Mar. 22, 2017), pp. 1-43, XP051291364.
International Search Report (ISR) and Written Opinion (WO) dated Feb. 26, 2018 for Application No. PCT/CN2017/088461.
NTT Docomo, Inc. New Radio (NR) Access Technology. 3GPP TSG RAN meeting #76 RP-171137. Jun. 8, 2017 (Jun. 8, 2017), p. 62, lines 23-41.
3GPP. 3rd Generation Partnership Project; Technical Specification Group Radio Access Network; Study on New Radio (NR) Access Technology (Release 14). 3GPPTR 38.912 V1.O.O. Mar. 31, 2017 (Mar. 31, 2017), entire document.
NTT Docomo, Inc. New Radio (NR) Access Technology. 3GPP TSG RAN meeting #76 RP-1711505. Jun. 8, 2017 (Jun. 8, 2017), entire document.
The First Office Action of corresponding Chinese application No. 210780053231.0, dated May 28, 2020.
Nsn et al. 3GPP TSG-RAN WG2 Meeting #85 R2-14004, LCP for Dual Connectivity, published on Feb. 14, 2014.
The EESR of corresponding European application No. 20176340.6, dated Jul. 21, 2010.

* cited by examiner

RESOURCE SCHEDULING METHOD AND APPARATUS FOR LOGICAL CHANNEL

CROSS-REFERENCE TO RELATED APPLICATION

This application is a continuation of International Application No. PCT/CN2017/088461, filed on Jun. 15, 2017, which is hereby incorporated by reference in its entirety.

TECHNICAL FIELD

The present disclosure relates to the field of wireless communication technologies and, in particular, to a resource scheduling method and apparatus for a logical channel.

BACKGROUND

In a 5G NR system, with a data duplication function of a Packet Data Convergence Protocol (PDCP), a scheme supporting data duplication allows for transmission of a duplicated PDCP Protocol Data Unit (PDU) to two Radio Link Control: Radio Link Control Protocol (RLC) entities respectively. That is, two different logical channels are mapped to a same PDCP entity, over one of which an original PDCP PDU is transmitted and over the other one of which a duplicate PDCP PDU is transmitted. Therefore, a frequency diversity gain is achieved to improve data transmission reliability.

For the data duplication, it needs to ensure that transmissions on two logical channels are transmitted to different carriers, but the carriers for the logical channels are not considered and distinguished in an existing LTE logical channel resource scheduling mode, thus a direct use of the LTE logical channel resource scheduling mode is not suitable for the data duplication.

SUMMARY

In this regard, the present disclosure provides a resource scheduling method and apparatus for a logical channel, which are suitable for logical channel resource scheduling for transmission of duplicated data The present disclosure provides a resource scheduling method for a logical channel, including:

after an uplink grant resource is obtained, selecting a logical channel from two logical channels mapped to a same PDCP entity to participate in uplink grant resource scheduling for a present transmission, where the two logical channels carry an original PDCP PDU and a duplicate PDCP PDU, respectively.

According to a specific implementation of the present disclosure, the method further includes:

determining the two logical channels mapped to the same PDCP entity.

According to a specific implementation of the present disclosure, the determining the two logical channels mapped to the same PDCP entity specifically includes:

obtaining, from a configuration parameter of a logical channel, an identifier of the other logical channel which is mapped to the same PDCP entity with the logical channel.

According to a specific implementation of the present disclosure, the selecting the logical channel from the two logical channels to participate in the uplink grant resource scheduling for the present transmission specifically includes:

maintaining variables of scheduling times for the two logical channels respectively, wherein the variable of scheduling times reflects the number of times a corresponding logical channel is scheduled; and preferentially selecting, according to the variable of scheduling times, a logical channel which is scheduled with fewer times from the two logical channels to participate in the uplink grant resource scheduling for the present transmission.

According to a specific implementation of the present disclosure, the variable of scheduling times has an initial value of 0, and each time the corresponding logical channel is scheduled, the corresponding variable of scheduling times is increased by 1;

after reaching a preset maximum value, the scheduling count variable is reset to 0.

According to a specific implementation of the present disclosure, the selecting the logical channel from the two logical channels to participate in the uplink grant resource scheduling for the present transmission further includes:

if the times the two logical channels are scheduled are the same, then selecting a logical channel with a higher Priority from the two logical channels to participate in the uplink grant resource scheduling for the present transmission; or if both the times the two logical channels are scheduled and Priorities of the two logical channels are the same, then selecting either one of the two logical channels to participate in the uplink grant resource scheduling for the present transmission.

According to a specific implementation of the present disclosure, the selecting the logical channel from the two logical channels mapped to the same PDCP entity to participate in the uplink grant resource scheduling for the present transmission specifically includes:

determining a physical layer carrier to which the obtained uplink grant resource belongs; and selecting, according to information on physical layer carriers with which the two logical channels are scheduled in advance, a logical channel capable of performing transmission on the uplink grant resource to participate in the uplink grant resource scheduling for the present transmission.

According to a specific implementation of the present disclosure, the two logical channels are indicated with different physical layer carriers in advance.

According to a specific implementation of the present disclosure, the information on the physical layer carriers with which the two logical channels are scheduled is obtained from a configuration parameter of a logical channel.

According to a specific implementation of the present disclosure, the configuration parameter of the logical channel is obtained from a RRC Connection Reconfiguration message.

According to a specific implementation of the present disclosure, the information on the physical layer carriers with which the two logical channels are indicated uses a form of a bitmap.

According to a specific implementation of the present disclosure, the uplink grant resource scheduling for the present transmission includes:

S1, for all logical channels whose variables Bj are greater than 0, allocating a resource to each logical channel in terms of priority from high to low, where a logical channel configured as infinity is allocated with a resource satisfying its data transmission requirement, and each of other logical channels is allocated with a resource of PBR*TTI; where an initial value of a Bj value of each logical channel is 0, which is increased by PBR*TTI each time the TTI increases, and the Bj value has an upper limit of PBR*BSD; after a logical channel is allocated with a resource, the corresponding Bj value is subtracted with a size of a SDU transmitted by the logical channel;

S2, determining whether there is a remaining uplink grant resource, if yes, proceeding with S3; otherwise, ending the uplink grant resource scheduling for the present transmission; and S3, scheduling all logical channels participating in the present uplink grant resource scheduling in terms of priority from high to low, where each scheduling meets a data transmission requirement from a logical channel which, is scheduled, and ending the uplink grant resource scheduling for the present transmission when all uplink grant resources are scheduled or the scheduling is completed for all logical channels.

The present disclosure also provides resource scheduling apparatus for a logical channel, including:

a logical channel selecting unit, configured to: after user equipment obtains an uplink grant resource, select a logical channel from two logical channels mapped to a same PDCP entity to participate in uplink grant resource scheduling for a present transmission, where the two logical channels carry an original PDCP PDU and a duplicate PDCP PDU, respectively.

According to a specific implementation of the present disclosure, the apparatus further includes:

a logical channel determining unit, configured to determine the two logical channels mapped to the same PDCP entity.

According to a specific implementation of the present disclosure, the logical channel determining unit is further configured to obtain, from a configuration parameter of a logical channel, an identifier of the other logical channel which is mapped to the same PDCP entity with the logical channel.

According to a specific implementation of the present disclosure, the logical channel selecting unit is specifically configured to:

maintain variables of scheduling times for the two logical channels respectively, where the variable of scheduling times reflects the number of times a corresponding logical channel is scheduled; and preferentially select, according to the variable of scheduling times, a logical channel which is scheduled with fewer times from the two logical channels to participate in the uplink grant resource scheduling for the present transmission.

According to a specific implementation of the present disclosure, the variable of scheduling times has an initial value of 0, and each time the corresponding logical channel is scheduled, the corresponding variable of scheduling times is increased by 1;

after reaching a preset maximum value, the scheduling count variable is reset to 0.

According to a specific implementation of the present disclosure, the logical channel selecting unit is further configured to:

if the times the two logical channels are scheduled are the same, then select a logical channel with a higher Priority from the two logical channels to participate in the uplink grant resource scheduling for the present transmission; or if both the times the two logical channels are scheduled and Priorities of the two logical channels are the same, then select either one of the two logical channels to participate in the uplink grant resource scheduling for the present transmission.

According to a specific implementation of the present disclosure, the apparatus further includes:

a carrier determining unit, configured to determine a physical layer carrier to which the obtained uplink grant resource belongs;

where the logical channel selecting unit is specifically configured to select, according to information on physical layer carriers with which the two logical channels are indicated in advance, a logical channel capable of performing transmission on the uplink grant resource to participate in the uplink grant resource scheduling for the present transmission.

According to a specific implementation of the present disclosure, the two logical channels are indicated with different physical layer carriers in advance.

According to a specific implementation of the present disclosure, the information on the physical layer carriers with which the two logical channels are indicated is obtained from a configuration parameter of a logical channel.

According to a specific implementation of the present disclosure, the configuration parameter of the logical channel is obtained from a RRC Connection Reconfiguration message.

According to a specific implementation of the present disclosure, the information on the physical layer carriers with which the two logical channels are indicated uses a form of a bitmap.

According to a specific implementation of the present disclosure, the apparatus further includes:

a resource scheduling unit, configured to schedule the uplink grant resource for the present transmission by performing operations of:

S1, for all logical channels whose variables Bj are greater than 0, allocating a resource to each logical channel in terms of priority from high to low, where a logical channel configured as infinity is allocated with a resource satisfying its data transmission requirement, and each of other logical channels is allocated with a resource of PBR*TTI; where an initial value of a Bj value of each logical channel is 0, which is increased by PBR*TTI each time the TTI increases, and the Bj value has an upper limit of PBR*BSD; after a logical channel is allocated with a resource, the corresponding Bj value is subtracted with a size of a SDU transmitted by the logical channel;

S2, determining whether there is a remaining uplink grant resource, if yes, proceeding with S3; otherwise, ending the uplink grant resource scheduling for the present transmission; and S3, scheduling all logical channels participating in the present uplink grant resource scheduling in terms of priority from high to low, where each scheduling meets a data transmission requirement from a logical channel which is scheduled, and ending the uplink grant resource scheduling for the present transmission when all uplink grant resources are scheduled or the scheduling is completed for all logical channels.

The present disclosure also provides a device, including:
one or more processors;
a memory;
one or more programs stored in the memory and executed by the one or more processors to perform operations in the above method.

The present disclosure also provides a storage medium including a computer executable instruction for performing operations in the above method when executed by a computer processor.

It can be seen from the foregoing technical solutions that the present disclosure takes into consideration a problem with regard to a guarantee that two logical channels mapped to the same PDCP entity need to be mapped to different physical layer carriers, after an uplink grant resource is obtained, a logical channel is selected from two logical channels mapped to a same PDCP entity to participate in uplink grant resource scheduling for a present transmission, such mode is well applicable to logical channel resource scheduling for data duplication.

DESCRIPTION OF EMBODIMENTS

In order to illustrate objectives, technical solutions and advantages of the present disclosure more clearly, the present disclosure will be described hereunder in detail with reference to accompanying drawings and specific embodiments.

The present disclosure is centered on: after an uplink grant resource is obtained, selecting one logical channel from two logical channels (one of which carries an original PDCP PDU and the other one of which carries a duplicate PDCP PDU) mapped to a same PDCP entity to participate in uplink grant resource scheduling for a present transmission. The method provided in the present disclosure will be described hereunder in detail with reference to embodiments.

Embodiment 1

Figure 1:
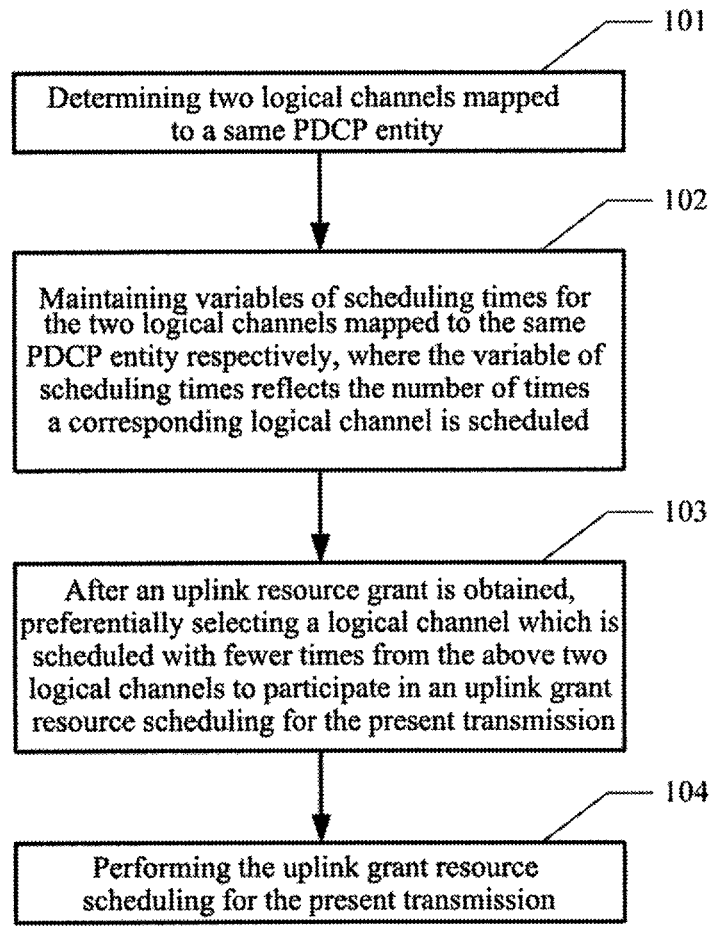
FIG. 1 is a flowchart of a resource scheduling method for a logical channel according to Embodiment 1 of the present disclosure.

FIG. 1 is a flowchart of a resource scheduling method for a logical channel according to Embodiment 1 of the present disclosure. As shown in FIG. 1, the method may include the following steps:

In 101, determining the two logical channels mapped to a same PDCP entity.

In this embodiment of the present disclosure, it may be obtained, from a configuration parameter of a logical channel, an identifier of the other logical channel which is mapped to the same PDCP entity with the logical channel. That is, when a network side device configures a logical channel, the two logical channels mapped to the same PDCP entity are respectively indicated with an identifier of a counterpart logical channel. The network side device may issue, in a Radio Resource Control (RRC) Connection Reconfiguration message, a configuration parameter of a logical channel to user equipment.

For instance, logical channels LC a and LC b are mapped to the same PDCP entity, where an LC a carries an original PDCP PDU and an LC b carries a duplicate PDCP PDU; ID of the LC b is indicated at the LC a, and ID of the LC a is indicated at the LC b.

In 102, maintaining variables of scheduling times for the two logical channels mapped to the same PDCP entity respectively, where the variable of scheduling times reflects the number of times a corresponding logical channel is scheduled.

Variables of scheduling times for the two logical channels are maintained in MAC respectively, for instance, a variable of scheduling times scheduling_count a is configured for the LC a, and a scheduling count variable scheduling_count b is configured for the LC b; the variable of scheduling times has an initial value of 0, and each time the corresponding logical channel is scheduled, the corresponding variable of scheduling times is increased by 1 until a maximum value scheduling_max is reached, and by then the scheduling count variable is reset to 0.

In 103, after an uplink resource grant is obtained, preferentially selecting a logical channel which is scheduled with fewer times from the above two logical channels to participate in an uplink grant resource scheduling for the present transmission.

After obtaining the uplink resource grant, an MAC layer of the user equipment may select, according to the following criteria, one of the two logical channels mapped to the same PDCP entity to participate in the present transmission:

First, the two logical channels mapped to the same PDCP entity are compared in terms of their variables of scheduling times, and a logical channel whose variable of scheduling times is smaller is preferable. For instance, for the LC a and the LC b, a logical channel with a smaller scheduling_count value is selected to participate in the uplink grant resource scheduling for the present transmission. Assuming that the LC a is selected, the scheduling_count a is increased by 1 in value after the LC a is scheduled in the present transmission.

If the two logical channels mapped to the same PDCP entity are the same in terms of their variables of scheduling times, then the two logical channels are compared in terms of their priorities, and a logical channel with a higher priority is selected to participate in the uplink grant resource scheduling for the present transmission.

In an existing LTE MAC protocol, a priority policy of a logical channel is specified, and the RRC configures three parameters for each logical channel: Priority, Priority Bit Rate (PBR), and Bucket Size Duration (BSD), the MAC determines, according to these three parameters, an order in which respective logical channels obtain resources. In this embodiment of the present disclosure, if the two logical channels mapped to the same PDCP entity are the same in terms of their variables of scheduling times, then the existing priority setting for logical channels is continued for use, and a logical channel with a higher priority is selected from the two logical channels mapped to the same PDCP entity to participate in the present uplink grant resource scheduling.

If the two logical channels mapped to the same PDCP entity are the same in terms of both their variables of scheduling times and priorities, then either one of the two logical channels is selected to participate in the uplink grant resource scheduling for the present transmission.

That is, assuming that the LC a is selected from the LC a and the LC b, then only the LC a is scheduled in the uplink grant resource scheduling for the present transmission, while the LC b is not scheduled.

In 104, performing the uplink grant resource scheduling for the present transmission.

For the two logical channels mapped to the same PDCP entity, only one of them is selected to participate in the uplink grant resource scheduling for the present transmission, while for logical channels not mapped to the same PDCP entity, all of them may participate in the uplink grant resource scheduling for the present transmission. After the logical channel participating in the uplink grant resource scheduling for the present transmission is determined, the scheduling mode may continue and follow the logical channel scheduling mode of the existing LTE MAC protocol. A brief description is made as follow:

As mentioned above, in the existing LTE MAC protocol, a priority policy of a logical channel is specified, and the RRC configures three parameters for each logical channel: Priority, PBR, and BSD. Among them, Priority determines an order in which logical channels are scheduled. The smaller the Priority value, the higher the priority. The PBR determines a resource allocation size for each logical channel that is scheduled, and the BSD determines an upper limit of resources that can be scheduled for each logical channel. In addition to these three parameters configured by the RRC, the MAC layer also maintains a variable Bj for each logical channel to indicate resources to be allocated for each logical channel. The Bj has an initial value of 0, which is increased as a Transmission Time Interval (TTI) increases. The increment per time is PBR*TTI and the upper limit of the Bj is PBR*BSD.

Figure 2:
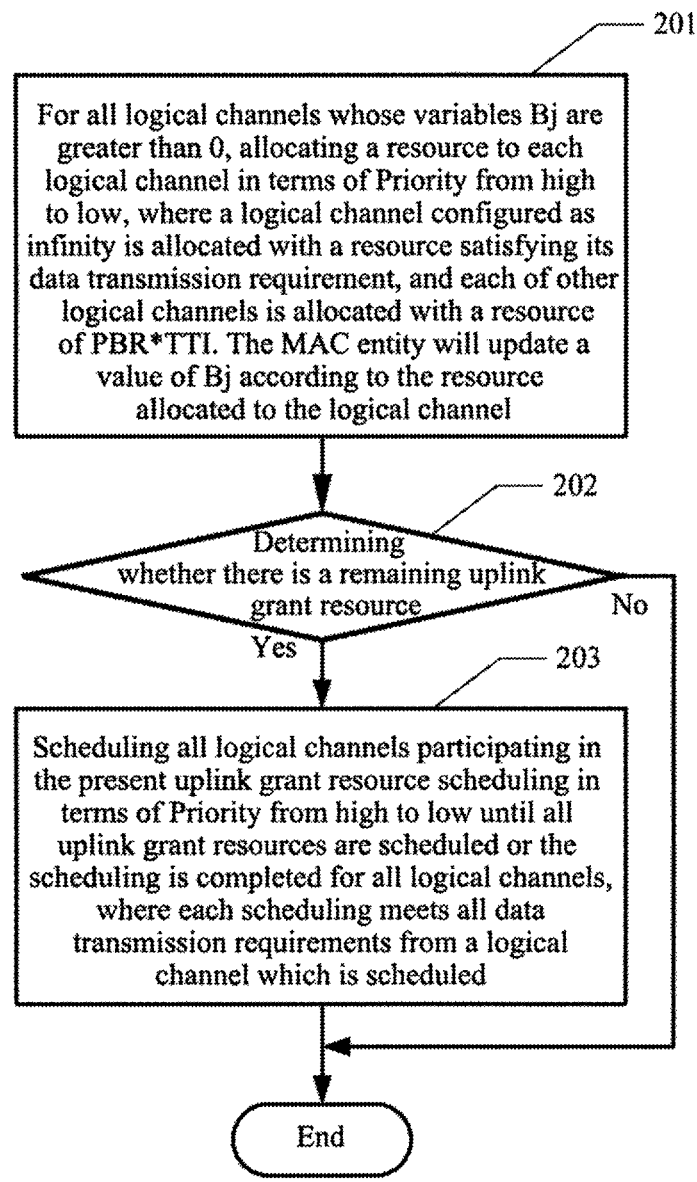
FIG. 2 is a flowchart of a method for performing uplink grant resource scheduling.

When the uplink grant resource scheduling is performed, the following steps as shown in FIG. 2 may be performed:

In 201, for all logical channels whose variables Bj are greater than 0, allocating a resource to each logical channel in terms of Priority from high to low, where a logical channel configured as infinity is allocated with a resource satisfying its data transmission requirement, and each of other logical channels is allocated With a resource of PBR*TTI. The MAC entity will update a value of Bj according to the resource allocated to the logical channel, that is, subtracting the Bj value by a size of a SDU (Service Data Unit) transmitted by a corresponding logical channel.

In 202, determining whether there is a remaining uplink grant resource, if yes, proceeding with 203; otherwise, ending the uplink grant resource scheduling for the present transmission.

In 203, scheduling all logical channels participating in the present uplink grant resource scheduling in terms of Priority from high to low, where each scheduling meets all data transmission requirements from a logical channel which is scheduled, and ending the uplink grant resource scheduling for the present transmission when all uplink grant resources are scheduled or the scheduling is completed for all logical channels.

Embodiment 2

Figure 3:
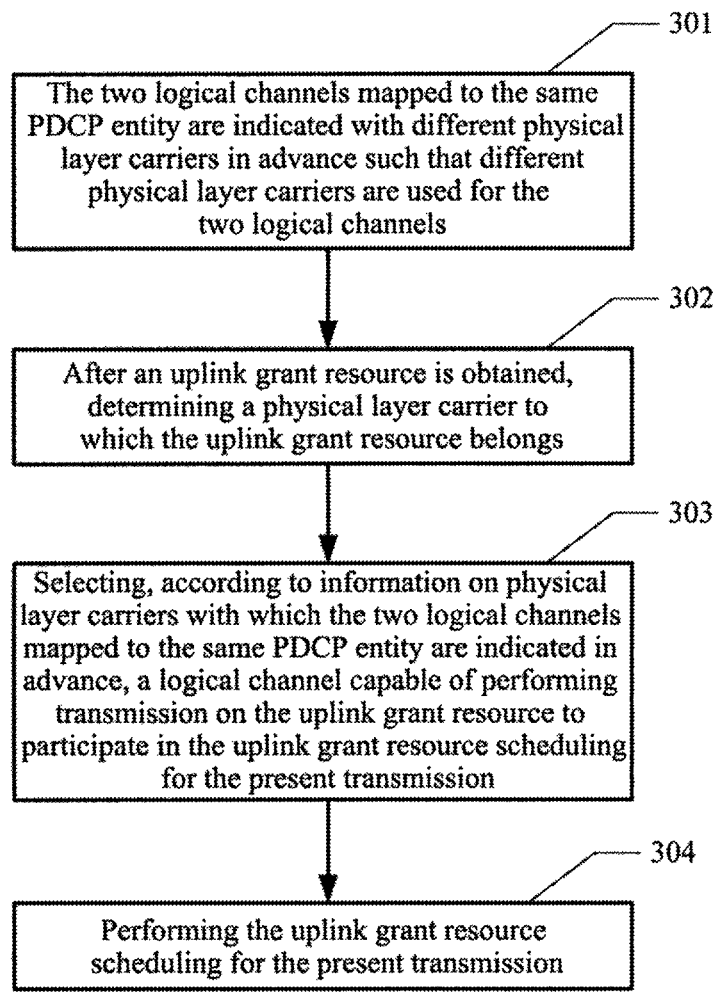
FIG. 3 is a flowchart of a resource scheduling method for a logical channel according to Embodiment 2 of the present disclosure.

FIG. 3 is a flow chart of a resource scheduling method for a logical channel according to Embodiment 2 of the present disclosure, as shown in FIG. 3, the method may include the following steps:

In 301, the two logical channels mapped to the same PDCP entity are indicated with different physical layer carriers in advance such that different physical layer carriers are used for the two logical channels.

In this embodiment of the present disclosure, the two logical channels mapped to the same PDCP entity may be indicated in advance as using different physical layer carriers. That is, when a network side device configures a logical channel, the two logical channels mapped to the same PDCP entity are configured such that they are indicated with different physical layer carriers. Information on the physical layer carriers with which the two logical channels are indicated is obtained from a configuration parameter of a logical channel at a user equipment side. Specifically, the network side device may obtain, in a RRC Connection Reconfiguration message, the configuration parameter of the logical channel.

An indication mode used by a logical channel for a physical layer carrier may be a form of a bitmap. For instance, if there are 6 physical layer carriers, then the logical channel LC a is indicated as 000111, and the logical channel LC b is indicated as 111000. That is, the logical channel LC a may use physical layer carriers numbered 3, 4, and 5, and the logical channel LC b may use physical layer carriers numbered 0, 1, and 2. The physical layer carriers of the two logical channels should not overlap.

In 302, after an uplink grant resource is obtained, determining a physical layer carrier to which the uplink grant resource belongs.

In 303, selecting, according to information on physical layer carriers with which the two logical channels mapped to the same PDCP entity are indicated in advance, a logical channel capable of performing transmission on the uplink grant resource to participate in the uplink grant resource scheduling for the present transmission.

When a physical layer carrier to which the uplink grant resource belongs is determined, a logical channel capable of performing transmission on the physical layer carrier to which the uplink grant resource belongs may be determined by querying the information on the physical layer carriers with which the two logical channels mapped to the same PDCP entity are indicated, and the logical channel is involved in the uplink grant resource scheduling for the present transmission.

In 304, performing the uplink grant resource scheduling for the present transmission.

For the two logical channels mapped to the same PDCP entity, only one of them is selected to participate in the uplink grant resource scheduling for the present transmission, while for logical channels not mapped to the same PDCP entity, all of them may participate in the uplink grant resource scheduling for the present transmission. After the logical channel participating in the uplink grant resource scheduling for the present transmission is determined, the scheduling mode may continue and follow the logical channel scheduling mode of the existing LTE MAC protocol. Reference may be made to related descriptions in Embodiment 1 for details, which will not be described herein again.

It is to be noted that, in a system, there is generally more than one PDCP entity that supports the duplication function. Hence, for a logical channel mapped to each PDCP entity, the foregoing method provided in the present disclosure needs to be performed to determine the uplink grant resource scheduling involved in the present transmission. For instance, assuming that there are N PDCP entities that support the duplication function, the foregoing method provided in the present disclosure is performed for each pair of two logical channels mapped to a same PDCP entity, and finally N logical channels are selected from 2N logical channels to participate in the uplink grant resource scheduling for the present transmission. Certainly, for logical channels participating in the uplink grant resource scheduling for the present transmission, in addition to the logical channels mapped to the N PDCP entities that support the duplication function, there are also other logical channels not mapped to the PDCP entities that support the duplication function, they also participate in the uplink grant resource scheduling for the present transmission.

The above is a detailed description of the method provided in the present disclosure, and the apparatus provided in the present disclosure will be described below in conjunction with an embodiment.

Figure 4:
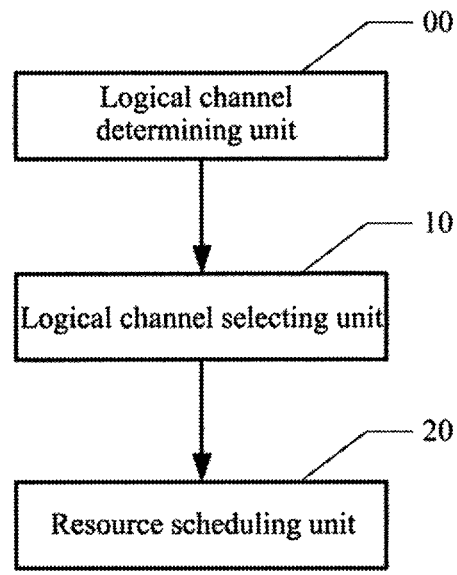
FIG. 4 is resource scheduling apparatus for a logical channel according to an embodiment of the present disclosure.

FIG. 4 is a resource scheduling apparatus for a logical channel according to an embodiment of the present disclosure. The apparatus includes a logical channel selecting unit 10, and the apparatus may further include a logical channel determining unit 00 and a resource scheduling unit 20. The main function of each component is as follows:

The logical channel determining unit 00 is in charge of determining two logical channels mapped to a same PDCP entity. Specifically, the logical channel determining unit 00 may be obtain, from a configuration parameter of a logical channel, an identifier of the other logical channel which is mapped to the same PDCP entity with the logical channel. That is, when a network side device configures a logical channel, the two logical channels mapped to the same PDCP entity are respectively indicated with an identifier of a counterpart logical channel. The network side device may issue, in a RRC Connection Reconfiguration message, a configuration parameter of a logical channel to user equipment.

The logical channel selecting unit 10 is in charge of: after the user equipment obtains an uplink grant resource, selecting one logical channel from two logical channels mapped to the same PDCP entity to participate in uplink grant resource scheduling for a present transmission, where the two logical channels carry an original PDCP PDU and a duplicate PDCP PDU, respectively.

Specifically, the logical channel selecting unit 10 may maintain variables of scheduling times for the two logical channels respectively, where the variable of scheduling times reflects the number of times a corresponding logical channel is scheduled. The variable of scheduling times has an initial value of 0, and each time the corresponding logical channel is scheduled, the corresponding variable of scheduling times is increased by 1; after reaching a preset maximum value, the scheduling count variable is reset to 0.

After that, the logical channel selecting unit 10 preferentially selects, according to the variable of scheduling times, a logical channel which is scheduled with fewer times from the two logical channels to participate in the uplink grant resource scheduling for the present transmission.

If the times of the two logical channels being scheduled are the same, the logical channel selecting unit 10 then selects a logical channel with a higher priority from the two logical channels to participate in the uplink grant resource scheduling for the present transmission.

Alternatively, if both the times of the two logical channels being scheduled and priorities are the same, the logical channel selecting unit 10 then selects either one of the two logical channels to participate in the uplink grant resource scheduling for the present transmission The resource scheduling unit 20 is in charge of performing resource scheduling for all logical channels participating in the uplink grant resource scheduling for the present transmission. The resource scheduling unit 20 may employ a scheduling mode used by the existing LTE MAC for a logical channel and, specifically, the following operations may be performed to schedule the uplink grant resource for the present transmission:

S1, for all logical channels whose variables Bj are greater than 0, allocating a resource to each logical channel in terms of Priority from high to low, where a logical channel configured as infinity is allocated with a resource satisfying its data transmission requirement, and each of other logical channels is allocated with a resource of PBR*TTI; where an initial value of a Bj value of each logical channel is 0, which is increased by PBR*TTI each time the TTI increases the upper limit of the Bj is PBR*BSD; after a logical channel is allocated with a resource, the corresponding Bj value is subtracted by a size of a SDU transmitted by the logical channel;

S2, determining whether there is a remaining uplink grant resource, if yes, proceeding with S3; otherwise, ending the uplink grant resource scheduling for the present transmission; and S3, scheduling all logical channels participating in the present uplink grant resource scheduling in terms of Priority from high to low, where each scheduling meets a data transmission requirement from a logical channel which is scheduled, and ending the uplink grant resource scheduling for the present transmission when all uplink grant resources are scheduled or the scheduling is completed for all logical channels.

Figure 5:
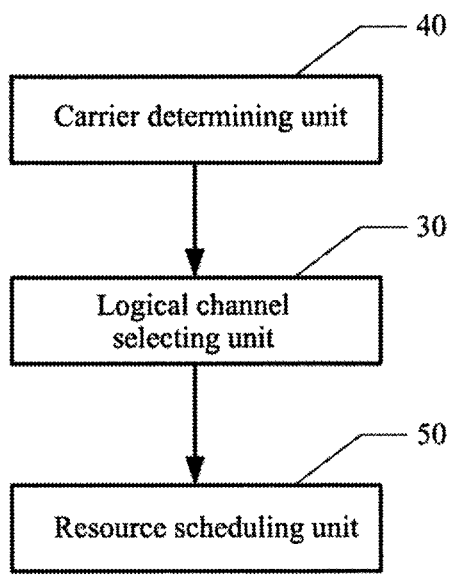
FIG. 5 is another resource scheduling apparatus for a logical channel according to an embodiment of the present disclosure.

FIG. 5 is another resource scheduling apparatus for a logical channel according to an embodiment of the present disclosure. The apparatus includes: a logical channel selecting unit 30, and the apparatus may further include a carrier determining unit 40 and a resource scheduling unit 50. The main function of each component is as follows:

The logical channel selecting unit 30 is configured to: after user equipment obtains an uplink grant resource, select a logical channel from two logical channels mapped to a same PDCP entity to participate in uplink grant resource scheduling for a present transmission, where the two logical channels carry an original PDCP PDU and a duplicate PDCP PDU, respectively.

The carrier determining unit 40 is in charge of determining a physical layer carrier to which the obtained uplink grant resource belongs.

In this embodiment of the present disclosure, the two logical channels mapped to the same PDCP entity may be indicated in advance as using different physical layer carriers. That is, when a network side device configures a logical channel, the two logical channels mapped to the same PDCP entity are configured such that they are indicated with different physical layer carriers. Information on the physical layer carriers with which the two logical channels are indicated is obtained from a configuration parameter of a logical channel at a user equipment side. Specifically, the network side device may obtain, in a RRC Connection Reconfiguration message, the configuration parameter of the logical channel.

An indication mode used by a logical channel for a physical layer carrier may be a form of a bitmap.

Specifically, the logical channel selecting unit 30 is in charge of selecting, according to information on physical layer carriers with which the two logical channels are indicated in advance, a logical channel capable of performing transmission on the uplink grant resource to participate in the uplink grant resource scheduling for the present transmission.

The resource scheduling unit 50 is in charge of performing resource scheduling for all logical channels participating in the uplink grant resource scheduling for the present transmission. The resource scheduling unit 50 may employ a scheduling mode used by the existing LTE MAC for a logical channel and, reference may be made to related descriptions of the resource scheduling unit 20 in the embodiment as shown in FIG. 4 for details, which will not be described herein again.

The apparatuses in FIG. 4 and FIG. 5 may be placed at an MAC layer of user equipment. The user equipment involved in the embodiments of the present disclosure may include, but is not limited to, a mobile phone, a tablet computer, a notebook, a PDA, a multimedia device, or even a car on the Internet, a smart wearable device or the like that has a wireless communication function. The network side device involved in the embodiments of the present disclosure may include, but is not limited to, base station devices such as a BST, a NodeB, or an eNodeB.

The above methods and apparatuses provided in the embodiments of the present disclosure may be implemented by one or more integrated circuits, such as a codec chip, or by a program instructing related hardware. The described program may be stored in a computer readable storage medium. Each unit in the above embodiments may be implemented in a form of hardware or in a form of a software function module. A combination of hardware and software in any specific form is not limited in the present disclosure.

For instance, the above methods may be implemented by a device including:
one or more processors;
a memory;
one or more programs stored in the memory and executed by the one or more processors to implement the following operations:
after an uplink grant resource is obtained, selecting a logical channel from two logical channels mapped to a same PDCP entity to participate in uplink grant resource scheduling for a present transmission,
where the two logical channels carry an original PDCP PDU and a duplicate PDCP PDU, respectively.

In addition, with the development of time and technology, the medium has a broader meaning, and the route of propagation of the program is not limited to tangible media, and the program may also be downloaded directly from the network. Any combination of one or more computer readable media may be used. The computer readable medium may be a computer readable signal medium or a computer readable storage medium. The computer readable storage medium may be, for instance, but not limited to, an electronic, magnetic, optical, electromagnetic, infrared, or semiconductor system, apparatus, or device, or any combination of the above. A more specific example (a non-exhaustive list) of the computer readable storage media includes: an electrically connected portable computer disk with one or more wires, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination of the foregoing. In this document, the computer readable storage medium may be any tangible medium that contains or stores a program which can be used by or in combination with an instruction execution system, apparatus or device.

The computer readable signal medium may include a data signal that is propagated in a baseband or as part of a carrier, and a computer readable program code is carried in the data signal. Such propagated data signal may take a variety of forms including, but not limited to, an electromagnetic signal, an optical signal, or any suitable combination of the foregoing. The computer readable signal medium also may be any computer readable medium other than the computer readable storage medium, and over such computer readable medium a program used by or in combination with the instruction execution system, apparatus, or device may be transmitted, propagated, or transferred.

The above descriptions are merely preferred embodiments of the present disclosure, and shall not be considered as a limitation to the present disclosure. Any modification, equivalent replacement, and improvement within the spirit and the principle of the present disclosure shall fall into the protection scope of the present disclosure.

What is claimed is:

1. A resource scheduling method for a logical channel, comprising:
after an uplink grant resource is obtained, selecting a logical channel from two logical channels mapped to a same Packet Data Convergence Protocol (PDCP) entity to participate in uplink grant resource scheduling for a present transmission,
wherein the two logical channels carry an original PDCP Protocol Data Unit (PDU) and a duplicate PDCP PDU, respectively;
determining the two logical channels mapped to the same PDCP entity;
wherein the selecting the logical channel from the two logical channels to participate in the uplink grant resource scheduling for the present transmission specifically comprises:
maintaining variables of scheduling times for the two logical channels respectively, wherein the variable of scheduling times reflects the number of times a corresponding logical channel is schedule; and
preferentially selecting, according to the variable of scheduling times, a logical channel which is scheduled with fewer times from the two logical channels to participate in the uplink grant resource scheduling for the present transmission.

2. The method according to claim 1, wherein the determining the two logical channels mapped to the same PDCP entity specifically comprises:
obtaining, from a configuration parameter of a logical channel, an identifier of the other logical channel which is mapped to the same PDCP entity with the logical channel.

3. The method according to claim 1, wherein the variable of scheduling times has an initial value of 0, and each time the corresponding logical channel is scheduled, the corresponding variable of scheduling times is increased by 1;
after reaching a preset maximum value, the scheduling count variable is reset to 0.

4. The method according to claim 1, wherein the selecting the logical channel from the two logical channels to participate in the uplink grant resource scheduling for the present transmission further comprises:
if the times the two logical channels are scheduled are the same, then selecting a logical channel with a higher Priority from the two logical channels to participate in the uplink grant resource scheduling for the present transmission; or if both the times the two logical channels are scheduled and Priorities of the two logical channels are the same, then selecting either one of the two logical channels to participate in the uplink grant resource scheduling for the present transmission.

5. The method according to claim 1, wherein the selecting the logical channel from the two logical channels mapped to the same PDCP entity to participate in the uplink grant resource scheduling for the present transmission specifically comprises:
determining a physical layer carrier to which the obtained uplink grant resource belongs; and
selecting, according to information on physical layer carriers with which the two logical channels are indicated in advance, a logical channel capable of performing transmission on the uplink grant resource to participate in the uplink grant resource scheduling for the present transmission.

6. Resource scheduling apparatus for a logical channel, comprising a processor and a memory storing instructions thereon, the processor when executing the instructions, being configured to:
after user equipment obtains an uplink grant resource, select a logical channel from two logical channels mapped to a same Packet Data Convergence Protocol (PDCP) entity to participate in uplink grant resource scheduling for a present transmission,
wherein the two logical channels carry an original PDCP Protocol Data Unit (PDU) and a duplicate PDCP PDU, respectively;
determine the two logical channels mapped to the same PDCP entity;
wherein the processor is further configured to:
maintain variables of scheduling times for the two logical channels respectively, wherein the variable of scheduling times reflects the number of times a corresponding logical channel is scheduled; and
preferentially select, according to the variable of scheduling times, a logical channel which is scheduled with fewer times from the two logical channels to participate in the uplink grant resource scheduling for the present transmission.

7. The apparatus according to claim 6, wherein the processor is further configured to obtain, from a configuration parameter of a logical channel, an identifier of the other logical channel which is mapped to the same PDCP entity with the logical channel.

8. The apparatus according to claim 7, wherein the configuration parameter of the logical channel is obtained from a Radio Resource Control (RRC) Connection Reconfiguration message.

9. The apparatus according to claim 6, wherein the variable of scheduling times has an initial value of 0, and each time the corresponding logical channel is scheduled, the corresponding variable of scheduling times is increased by 1;
after reaching a preset maximum value, the scheduling count variable is reset to 0.

10. The apparatus according to claim 6, wherein the processor is further configured to:
if the times the two logical channels are scheduled are the same, then select a logical channel with a higher Priority from the two logical channels to participate in the uplink grant resource scheduling for the present transmission; or
if both the times the two logical channels are scheduled and Priorities of the two logical channels are the same, then select either one of the two logical channels to participate in the uplink grant resource scheduling for the present transmission.

11. The apparatus according to claim 6, wherein the processor is further configured to:
determine a physical layer carrier to which the obtained uplink grant resource belongs;
select, according to information on physical layer carriers with which the two logical channels are indicated in advance, a logical channel capable of performing transmission on the uplink grant resource to participate in the uplink grant resource scheduling for the present transmission.

12. The apparatus according to claim 11, wherein the two logical channels are indicated with different physical layer carriers in advance.

13. The apparatus according to claim 11, wherein the information on the physical layer carriers with which the two logical channels are indicated is obtained from a configuration parameter of a logical channel.

14. The apparatus according to claim 11, wherein the information on the physical layer carriers with which the two logical channels are indicated uses a form of a bitmap.

15. The apparatus according to claim 6, wherein the processor is further configured to:
schedule the uplink grant resource for the present transmission by performing operations of:
S1, for all logical channels whose variables Bj are greater than 0, allocating a resource to each logical channel in terms of priority from high to low, wherein a logical channel configured as infinity is allocated with a resource satisfying its data transmission requirement, and each of other logical channels is allocated with a resource of Prioritized Bit Rate (PBR)*Transmission Time Interval (TTI); wherein an initial value of a Bj value of each logical channel is 0, which is increased by PBR*TTI each time the TTI increases, and the Bj value has an upper limit of PBR*Bucket Size Duration (BSD); after a logical channel is allocated with a resource, the corresponding Bj value is subtracted with a size of a Service Data Unit (SDU) transmitted by the logical channel;
S2, determining whether there is a remaining uplink grant resource, if yes, proceeding with S3; otherwise, ending the uplink grant resource scheduling for the present transmission; and
S3, scheduling all logical channels participating in the present uplink grant resource scheduling in terms of priority from high to low, wherein each scheduling meets a data transmission requirement from a logical channel which is scheduled, and ending the uplink grant resource scheduling for the present transmission when all uplink grant resources are scheduled or the scheduling is completed for all logical channels.

16. A non-transitory computer-readable storage medium storing a computer executable instruction which, when executed by a computer processor, causes the processor to:
after an uplink grant resource is obtained, select a logical channel from two logical channels mapped to a same Packet Data Convergence Protocol (PDCP) entity to participate in uplink grant resource scheduling for a present transmission,
wherein the two logical channels carry an original PDCP Protocol Data Unit (PDU) and a duplicate PDCP PDU, respectively;
determine the two logical channels mapped to the same PDCP entity;

wherein the processor is further configured to:
maintain variables of scheduling times for the two logical channels respectively, wherein the variable of scheduling times reflects the number of times a corresponding logical channel is schedule; and
preferentially select, according to the variable of scheduling times, a logical channel which is scheduled with fewer times from the two logical channels to participate in the uplink grant resource scheduling for the present transmission.

* * * * *

UNITED STATES PATENT AND TRADEMARK OFFICE
CERTIFICATE OF CORRECTION

Page 1 of 1

PATENT NO. : 10,880,916 B2
APPLICATION NO. : 16/353719
DATED : December 29, 2020
INVENTOR(S) : Hai Tang It is certified that error appears in the above-identified patent and that said Letters Patent is hereby corrected as shown below:

On the Title Page

Item (71) Applicant: Line 3, delete:
"Guangdong (CN)"
Insert:
--Dongguan, Guangdong (CN)--

Item (73) Assignee: Line 3, delete:
"Guangdong (CN)"
Insert:
--Dongguan, Guangdong (CN)--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*